3,083,243
PRODUCTION OF DIALKYLNAPHTHALENES
Robert L. Carden, Poteau, and George C. Feighner, Ponca City, Okla., assignors to Continental Oil Company, Ponca City, Okla., a corporation of Delaware
No Drawing. Filed Aug. 27, 1959, Ser. No. 836,347
3 Claims. (Cl. 260—671)

The present invention relates to an improved process for the production of dialkylnaphthalenes. More particularly, it relates to a process for preparing high-molecular-weight dialkylnaphthalenes whereby the formation of monoalkylnaphthalenes is substantially suppressed.

Dialkylnaphthalenes are useful materials, since they can be sulfonated and converted to certain salts. Both the organic and inorganic salts of dinonylnaphthalene sulfonic acid can be used as additives in lubricating oils. While these materials are satisfactory, there are applications in which a higher molecular weight sulfonate is desirable. In addition, since naphthalene is more expensive than nonene, or similar olefins, it would be desirable to lower the naphthalene to olefi ratio in the dialkylnaphthalene.

Since dialkylnaphthalenes are the desired product, it follows that processes which give a high yield of monoalkylnaphthalenes are undesirable. At one time, monoalkylnaphthalenes were a particularly desirable product. Accordingly, a good many prior art processes are concerned with the production of monoalkylnaphthalenes. Naturally, such processes are irrelevant to the present process.

We have found that when nonene dimer is alkylated with napthalene in the presence of a protonating catalyst alone, a large amount of mononoynlnapthalene is formed. This result is caused by cleavage of the nonene dimer by the alkylating catalyst. Obviously, this is not desirable.

It is an object of the present invention to provide a process for the production of high-molecular-weight dialkylnaphthalenes. It is still another object of the present invention to provide such a process whereby the formation of monoalkylnaphthalenes is suppressed. Other objects and advantages will become apparent from the following description.

Broadly stated, the present invention provides a process for the production of high-molecular-weight dialkylnaphthalenes, in which the process comprises the steps of: dimerizing nonene in the presence of a protonating catalyst; separating from the reaction product a dimer fraction consisting of a mixture of highly branched olefins containing a substantial amount of $C_{18}$ hydrocarbons; alkylating said dimer fraction with napththalene in the presence of an alkylation catalyst and a substantial quantity of monoalkylnaphthalenes; separating from the alkylation reaction product a nonane fraction, a naphthalene fraction, a monoalkylnaphthalene fraction; and a product consisting essentially of dialkylnaphthalenes having molecular weights in the range of about 400 to 480; and recycling the monoalkylnaphthalene fraction to the alkylation zone.

Before proceeding to specific examples which illustrate our invention, it might be better, first, to define the materials and operating conditions of our invention.

For the sake of brevity the abbreviations MNN, DNN, and DAN will be used herein to represent monononyl napththalene, dinonylnaphthalene, and dialkylnaphthalene, respectively.

Generally, any grade of naphthalene can be used in our invention. Obviously, the better grades will give a purer product. We prefer to use a semi-purified grade, which is known commercially as 78° napthalene.

The nonene which is dimerized in our process is not a pure compound, but a mixture of olefins. The preferred material is a by-product of the polymerization of propene using a phosphoric acid-kieselguhr catalyst at about 1000 p.s.i.g. and 400° F. The catalytic polymerization of propylene resulting in the formation of by-product nonene is illustrated in the patent to Grote et al., U.S. Patent No. 2,457,146, the nonene being described therein as low boiling polymer ($C_6$–$C_{12}$), a portion of which is recycled through line 32, and the remainder of which is withdrawn through line 33. The "true" nonene portion is highly branched and contains tertiary carbon atoms. The following physical properties are typical of the nonene we prefer to use:

A.P.I. gravity _____ 62.2
Initial boiling point _____ °F__ 127
10% _____ °F__ 240
50% _____ °F__ 274
90% _____ °F__ 303
End point _____ °F__ 326

Mass spectrometer analyses of several typical nonene samples are shown in Table I.

TABLE I

*Mass Spectrometer Analyses of Nonene Samples*

| Compound | Sample A | Sample B |
|---|---|---|
|  | Liquid Volume Percent | |
| $C_5$ and less | 2.7 | -------- |
| $C_6$ | 3.0 | -------- |
| $C_7$ | 7.2 | 7.0 |
| $C_8$ | 12.8 | 14.7 |
| $C_9$ | 45.3 | 55.5 |
| $C_{10}$ | 23.1 | 19.1 |
| $C_{11}$ | 5.4 | 3.4 |
| $C_{12}$ | 0.5 | 0.3 |

It is to be understood that this is typical, and we do not intend to be limited thereby. Olefins having physical properties other than these are also suitable.

The nonene dimer produced by the dimerization reaction is not a "true" octadecene. This is apparent from the preceding description of the nonene. The material may be described as a mixture of highly branched olefins, containing a substantial amount of $C_{18}$ material. In general, the nonene dimer has an average molecular weight in the range of 230 to 270.

The amount of nonene dimer used in the alkylation reaction may vary from 1 to 3 moles of nonene dimer per mole of naphthalene.

A protonating catalyst is used in our process in both the dimerization and alkylation reactions. Preferred protonating catalysts are the alkylation catalysts which include aluminum chloride sulfuric acid, boron trifluoride and hydrofluoric acid. In the dimerization reaction, we prefer to use sulfuric acid; whereas, in the alkylation reaction, we prefer to use aluminum chloride. When using aluminum chloride as the catalyst, a protondonor promoter is used. Examples of preferred promoters are anhydrous hydrogen chloride and water.

While sulfuric acid is the preferred protonating catalyst for the dimerization of nonene, other protonating catalyst, such as $BF_3 \cdot H_2O$, are satisfactory. The dimerization conditions do not form a critical feature of our invention.

In the alkylation reaction, a slurry of naphthalene in MNN is reacted with the nonene dimer using controlled amounts of protonating catalysts, a promoter (if needed), and controlled operating conditions. Usually, all of the MNN is recycled to a succeeding reaction. We have found that the use of the MNN gives a greater relative yield of DAN. It is our hypothesis that the MNN acts in a manner which prevents cleavage of the "octadecyl" groups to "nonyl" groups so that the molecular weight of the alkyl groups in the DAN is higher. It is to be understood that this is only a hypothesis and we do not intend to be limited thereby.

The amount of aluminum chloride which can be used in the alkylation reaction is from 2 to 10 percent by weight of the nonene dimer used. Preferably, we use an amount in the range of 2.5 to 5 percent of the nonene dimer. When using hydrogen chloride as the promoter, we use from 2 to 12 percent by weight of the aluminum chloride. Other promotoers, when used, fall within this range on a hydrogen equivalent basis.

MNN produced by our process and recycled to the succeeding step is not a pure compound, but is determined by a boiling point range. Generally, the MNN is the material distilling between 175° C. at 100 mm. Hg pressure to 250° C. at 20 mm. Hg pressure.

It is within the scope of our process to recycle the unreacted naphthalene. In such a case, the material distilling above 175° C. at 1 atmosphere would be combined with the MNN and recycled.

The DAN produced by our process is also not a pure product, but a mixture of dialkylnaphthalenes. In general, the average molecular weight of the DAN is from 400 to 480. The material distilling above 250° C. at 20 mm. Hg pressure is the DAN of our process.

A suitable temperature range for conducting our process is 25 to 65° C., with a preferable temperature range being from 40 to 50° C.

Time is not a critical factor in our process. Usually, we prefer to add the nonene dimer to the reaction vessel at a moderate and uniform rate, providing better contact, improved yields, and more effective temperature control of the exothermic reaction.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims.

EXAMPLE I

This example shows the dimerization of nonene.

One thousand grams of nonene was charged to a flask and cooled to 10° C. Two hundred grams of concentrated (98%) sulfuric acid was added dropwise to the nonene while stirring and keeping the temperature below 35° C. After all of the acid had been added, the batch was stirred for 2 hours at room temperature. The yield of nonene polymer was 916 grams. The polymer had a molecular weight of 264, which is slightly higher than theoretical.

EXAMPLE II

In this example, several alkylations of nonene dimer with naphthalene were made. Data on the materials used are shown in Table II. The procedure was as follows:

The MNN and naphthalene were charged to a reaction flask and HCl was added for about 10 minutes. One-half of the aluminum chloride was then added, and the nonene dimer was added over a 30-minute period. The remander of the aluminum chloride was added at 10 and 20 minutes elapsed time, with the HCl being added continuously throughout the reaction. The temperature was maintained at 40 to 50° C. throughout the reaction. The crude alkylate was washed with water and then washed twice with dilute sodium hydroxide. The crude alkylate was fractionated as follows:

Fraction—
  Nonane and water____ Temperature and pressure
  Naphthalene_____ To 175° C. at 1 atm.
  MNN_____ To 175° C. at 100 mm. Hg.
  DAN_____ T. 250° C. at 20 mm. Hg.
                      Bottoms.

The data on the products of this example are shown in Table III. In addition, sodium sulfonates were prepared from the DAN produced in run Nos. D, E, and F. The combining weights of these sodium sulfonates are shown in Table III, also.

TABLE II

*Alkylation of Nonene Dimer*

| Run No. | Mole Ratio Naphthalene/Nonene Dimer | Charge, grams | | | | | | |
|---|---|---|---|---|---|---|---|---|
| | | Nonene Dimer | Naphthalene | MNN | AlCl₃ | | Promoter | |
| | | | | | Wt. | Percent | Wt. | Percent |
| A | 1:2 | 528 | 128 | 254 | 26.4 | 5.0 | 2.64 | 10 |
| B | 1:1 | 528 | 256 | 350 | 18.5 | 3.5 | 2.22 | 12 |
| C | 1:1 | 528 | 256 | 310 | 18.5 | 3.5 | 1.48 | 8 |
| D | 1:1 | 528 | 256 | 325 | 18.5 | 3.5 | 0.74 | 4 |
| E | 1:1 | 528 | 256 | 340 | 18.5 | 3.5 | 1.11 | 6 |
| F | 1:1 | 528 | 256 | 340 | 23.8 | 4.5 | 2.38 | 10 |

TABLE III

*Alkylation of Nonene Dimer*

| Run No. | Product Data | | | | | |
|---|---|---|---|---|---|---|
| | A | B | C | D | E | F |
| Crude alkylate, g | 726 | 1,063 | 996 | 1,033 | 1,049 | 1,085 |
| Fraction: | | | | | | |
|   Nonane, g | | 64 | 52 | 66 | 76 | 67 |
|   Naphthalene, g | 28 | 95 | 111 | 91 | 103 | 74 |
|   MNN, g | 242 | 306 | 325 | 340 | 406 | 328 |
|   Dialkylnaphthalene, g | 435 | 578 | 508 | 513 | 433 | 516 |
| Mol. Wt. of DAN | 435 | 431 | 420 | 438 | 404 | 457 |
| DAN/Nonene charged | 0.83 | 1.09 | 0.97 | 0.97 | 0.82 | 0.99 |
| Naphthalene consumed/DAN | 0.26 | 0.28 | 0.29 | 0.32 | 0.35 | 0.35 |
| Combining weight—sodium sulfonate | | | | 513 | 534 | 559 |

The dialkylnaphthalene prepared in accordance with the procedure of Example II may be sulfonated and converted to overbased barium sulfonates in accordance with the process of U.S. Patent No. 2,861,951 issued November 25, 1958, to Robert L. Carlyle. The product prepared thereby may be used as a detergent in lubricating oils.

In summary, we have shown a process for the preparation of dialkylnaphthalenes having molecular weights in excess of dinonylnaphthalene. The process uses mononylnaphthalene to suppress the cleavage of "octadecyl" groups to "nonyl" groups, thereby attaining higher molecular weight groups in the dialkylnaphthalenes.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. An improved process for the production of dialkylnaphthalenes having molecular weights in the range of 400 to 480, said process comprising:

(a) producing a highly branched $C_{18}$ olefin by the dimerization, in the presence of a protonating catalyst selected from the group consisting of aluminum chloride, sulfuric acid, boron trifluoride and hydrofluoric acid of an olefinic polymer of propene, (b) reacting naphthalene with from 1 to 3 moles of said highly branched $C_{18}$ olefin in the presence of a protonating catalyst consisting of aluminum chloride and a proton-donor promoter, and monoalkylnaphthalene fraction at a temperature in the range of about 25° C. to about 60° C., (c) recovering from said reaction mixture a mixture comprising dialkylnaphthalenes having molecular weights in the range of 400 to 480, unreacted feedstock fraction, and monoalkylnaphthalene fraction, (d) recycling to step (b) the monoalkylnaphthalene fraction, whereby the formation of additional monoalkylnaphthalene is substantially suppressed.

2. An improved process for the production of dialkylnaphthalenes having molecular weights in the range of 400 to 480, said process comprising:

(a) producing a highly branched $C_{18}$ olefin by the dimerization, in the presence of a protonating catalyst comprising sulfuric acid, of nonene characterized as being produced by the polymerization of propene and possessing greater than 40 percent (by volume) of $C_9$ material, (b) reacting naphthalene with from 1 to 3 moles of said highly branched $C_{18}$ olefin, per mole of naphthalene, in the presence of a protonating catalyst consisting of aluminum chloride and a proton-donor promoter, and from 0.10 to 2.0 mole of a mononylnaphthalene fraction at a temperature in the range of about 25° C. to about 60° C., (c) recovering from the reaction mixture a nonane fraction, a naphthalene fraction, a mononylnaphthalene fraction, and a fraction comprising a mixture of dialkylnaphthalenes having molecular weights in the range of 400 to 480, (d) recycling to step (b) the mononylnaphthalene fraction of step (c).

3. The process of claim 2 wherein the aluminum chloride catalyst of step (b) is present in the range of 2 to 10 percent (weight) of the highly branched $C_{18}$ olefin, and wherein the promoter is seelcted from the group consisting of anhydrous hydrogen chloride and water, and is present in the range of 2 to 12 percent (weight) of the aluminum chloride.

References Cited in the file of this patent

UNITED STATES PATENTS

| | | |
|---|---|---|
| 2,161,201 | Schaefer | June 6, 1939 |
| 2,381,198 | Bailey et al. | Aug. 7, 1945 |
| 2,819,324 | McCaulay et al. | Jan. 7, 1958 |
| 2,943,118 | Cahn et al. | June 28, 1960 |
| 2,949,492 | Weaver | Aug. 16, 1960 |